United States Patent
Sourov et al.

(10) Patent No.: US 7,587,410 B2
(45) Date of Patent: Sep. 8, 2009

(54) DYNAMIC CUBE SERVICES

(75) Inventors: Alexander A. Sourov, Seattle, WA (US); James Zhen Lin, Sammamish, WA (US); Philip Yuen, Bellevue, WA (US); Keshav Puttaswamy, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 535 days.

(21) Appl. No.: 11/087,289

(22) Filed: Mar. 22, 2005

(65) Prior Publication Data

US 2006/0218157 A1 Sep. 28, 2006

(51) Int. Cl.
*G06F 7/00* (2006.01)

(52) U.S. Cl. .......................................... 707/102; 707/5

(58) Field of Classification Search ............. 707/103 R, 707/104.1, 100–102, 1–5
See application file for complete search history.

(56) References Cited

U.S. PATENT DOCUMENTS

| | | | | |
|---|---|---|---|---|
| 5,918,232 | A * | 6/1999 | Pouschine et al. ....... | 707/103 R |
| 6,356,900 | B1 * | 3/2002 | Egilsson et al. ................ | 707/5 |
| 6,557,008 | B1 * | 4/2003 | Temple et al. ............. | 707/104.1 |
| 6,594,528 | B1 * | 7/2003 | Hirano ........................... | 700/9 |
| 6,609,123 | B1 * | 8/2003 | Cazemier et al. ................ | 707/4 |
| 6,651,062 | B2 * | 11/2003 | Ghannam et al. ............. | 707/10 |
| 6,931,418 | B1 * | 8/2005 | Barnes .................... | 707/103 R |
| 7,010,523 | B2 * | 3/2006 | Greenfield et al. .............. | 707/3 |
| 7,072,899 | B2 * | 7/2006 | Lokken ....................... | 707/101 |
| 7,113,964 | B1 * | 9/2006 | Bequet et al. ................ | 707/204 |
| 7,177,854 | B2 * | 2/2007 | Chun et al. ..................... | 707/2 |
| 7,225,200 | B2 * | 5/2007 | Chickering et al. ......... | 707/102 |
| 7,236,982 | B2 * | 6/2007 | Zlatanov et al. ............. | 707/102 |
| 2003/0115301 | A1 * | 6/2003 | Koskimies ................... | 709/221 |
| 2003/0120593 | A1 * | 6/2003 | Bansal et al. ................. | 705/39 |
| 2004/0049505 | A1 * | 3/2004 | Pennock ........................ | 707/5 |
| 2004/0153430 | A1 * | 8/2004 | Sayad .......................... | 706/61 |
| 2005/0131924 | A1 * | 6/2005 | Jones .......................... | 707/100 |

OTHER PUBLICATIONS

Computer Dictionary, Microsoft Press, 3th edition, p. 430, Copyright @ 1997.*

* cited by examiner

*Primary Examiner*—Wilson Lee
(74) *Attorney, Agent, or Firm*—Merchant & Gould, P.C.

(57) ABSTRACT

A method and system for dynamic creation of an OLAP cube is disclosed which enables OLAP cubes to be created from custom database entities and custom database entity relationships. A created cube may be implemented on a local or remote data server using a variety of modular database protocols. A computer-readable medium and system for OLAP cube data permission derivation is also disclosed. OLAP cube data permissions are derived from category data associated with an OLAP database. The resulting cube data permissions are associated with data in the OLAP cube.

21 Claims, 6 Drawing Sheets

DYNAMIC CUBE SERVICES

TECHNICAL FIELD

The present invention relates generally to the field of software applications. More particularly, the present invention relates to software applications that store and sort data, such as through data queries. More particularly still, aspects of the present invention relate to dynamic OLAP (Online Analytical Processing) database cubes and OLAP cube security.

BACKGROUND OF THE INVENTION

In order to manage large quantities of data, computer software applications known as relational database applications have been developed to organize and store the data in a logical manner. Typical relational database applications comprise a large number of records of interrelated information, wherein each record comprises a predetermined number of fields. In the context of a relational database, a database management system is typically used to provide the software tools to manipulate the database more simply. Example database management systems include Microsoft® Access, and Microsoft® SQL Server, among others. A database management system typically provides the user the ability to add, modify or delete data, and the ability to query, sort, or recombine records in the database. Moreover, the usual system also provides functionality related to maintaining the security and integrity of the database data.

An OLAP (Online Analytical Processing) database is a relational database system capable of handling queries more complex than those handled by standard relational databases. An OLAP database typically uses multidimensional access to data (viewing the data by several different criteria or "dimensions"), intensive calculation capability, and specialized indexing techniques. An OLAP database typically considers each data attribute (such as product, sales region, and time period) as a separate dimension. An OLAP database manager can compute the intersection of a plurality of dimensions (such as all products sold in a given region during a given time period within a certain range of retail prices) and display the intersection. OLAP databases typically allow users to query complex data interrelationships, and discover previously unknown patterns and relationships between data.

A cube is an OLAP data structure. A cube typically contains dimensions (such as a location dimension Country/Region/City, or a time dimension Hour/Minute/Second), in addition to data fields (such as Retail Price). Dimensions may be used to organize types of data into hierarchies with levels of detail, while data fields may be used to measure quantities. A cube may be used to aggregate (measure by way of performing mathematical operations) the facts within dimensions of a given OLAP schema so that queries may be accelerated.

OLAP cubes are typically static, and such a cube is therefore limited to a relatively small number of dimensions. Further, the dimensions in a static OLAP cube are typically predefined by the database management system developer, or by the database administrator. As a result, static OLAP cubes are inherently rigid which can limit their usefulness in many contexts. Further, security in OLAP cubes must typically be manually defined, regardless of whether security has already been specified for the OLAP database upon which the OLAP cube is based. As a result, database administrators must set up security once for the database, and then once again for each OLAP cube in use.

It is with respect to these considerations and others that the present invention has been made.

SUMMARY OF THE INVENTION

In accordance with the present invention, a computer-implemented method is provided for dynamic creation of an OLAP cube. Receipt of a data source specification causes one or more dynamic relationships between entities in the data source to be computed. An OLAP cube is implemented based on the dynamic relationships between entities. The OLAP cube may be implemented locally, or on a remote server. OLAP cubes may be implemented on remote servers using a variety of transaction protocols.

In accordance with other aspects, the present invention relates to a computer readable medium accessible to a computing system and encoding a computer program for automatically deriving cube permission settings in an OLAP environment. When a specification of category data is received, one or more categories in the data are analyzed. Cube permission settings are derived from the analysis, and the cube permission settings are associated with the cube data.

In accordance with yet other aspects, the present invention relates to a system for creating a dynamic OLAP cube. An I/O module receives user input, and displays the results of operations. A graphing module analyzes entity interrelationships and builds a cube. A translation module implements the cube on a data server, performing translation as needed via one or more database transaction protocols. Finally, a security module derives cube permission settings from category data associated with an OLAP database.

These and various other features as well as advantages, which characterize the present invention, will be apparent from a reading of the following detailed description and a review of the associated drawings.

DETAILED DESCRIPTION OF THE INVENTION

Figure 1:
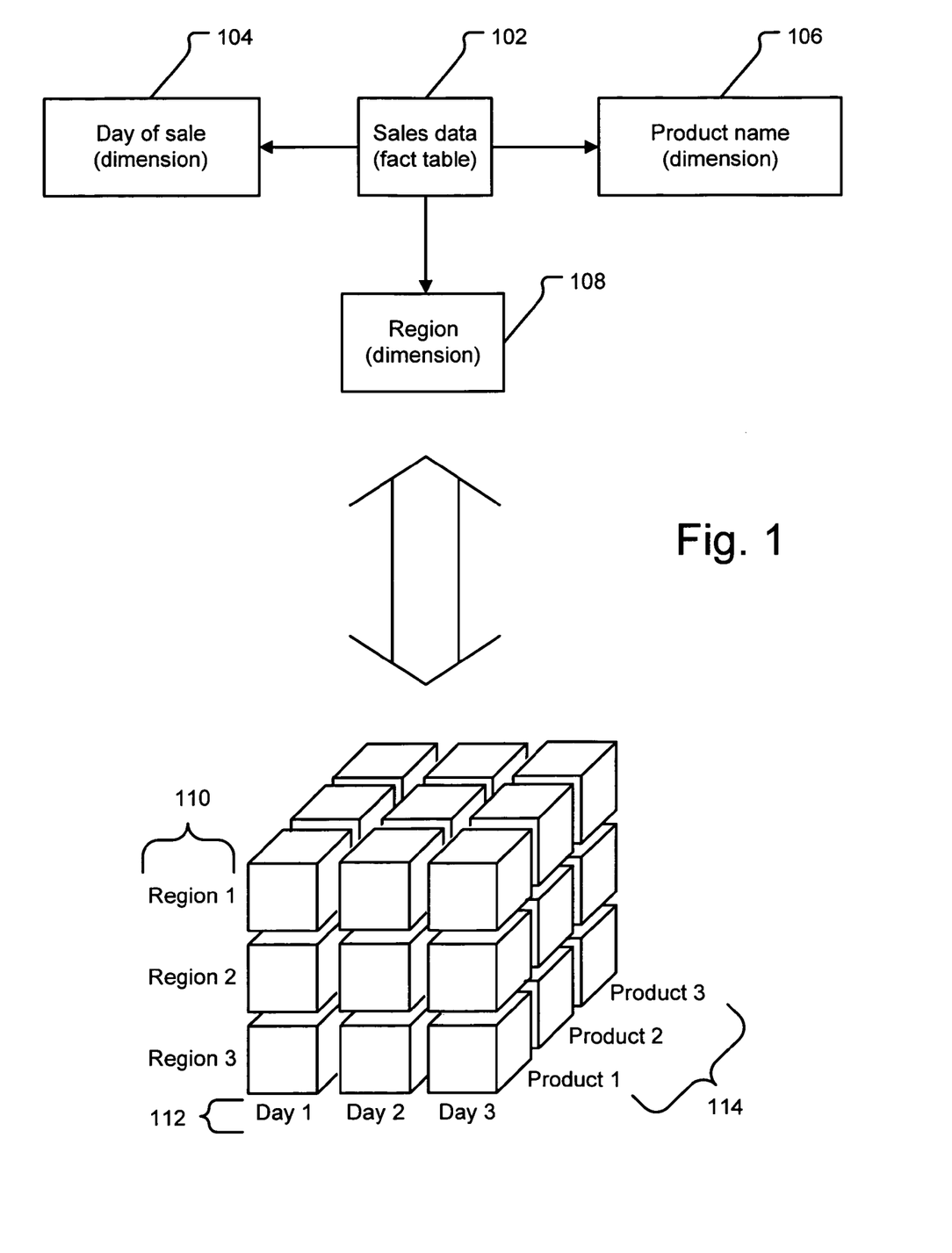
FIG. 1 illustrates an exemplary relationship between a plurality of tables, and an analogous OLAP cube and its dimensions.

In contrast to a static OLAP cube, a dynamic OLAP cube can provide an arbitrarily large number of dimensions. The dimensions may be dynamically defined by a user or database administrator, and the cube recomputed at any time. Further, a database administrator can enter one or more custom fields into the database, and these custom fields can be used as dimensions in the computation of a dynamic OLAP cube. The dynamic relationships between cube dimensions may be computed at runtime. FIG. 1 illustrates an exemplary relationship between tables 102, 104, 106 and 108, and the analogous OLAP cube defined by dimensions 110, 112 and 114.

It is first useful to understand the entities present in a typical OLAP database. A fact table is simply a table that contains facts. A fact table may contain fields which hold facts, and/or fields which hold foreign keys. A foreign key refers to one or more fields in another table. A foreign key defines how two tables are related. For example, a Project Resource table might contain a foreign key EmployeeName, which relates to an EmployeeFullName field in an Employees table. A fact table can use one or more foreign keys to link into dimension tables. A dimension table contains category-specific data and/or references to data. For example, dimension table 104 contains "sales date" category data. Similarly, dimension table 106 contains "product" category data, and dimension table 108 contains "region" category data. A dimension table linked to a fact table via a foreign key is said to be a "dimension" of the fact table. In the illustrated embodiment, fact table 102 contains facts relating to product sales data (e.g., which products, when they were sold, where they were sold, etc.). Fact table 102 is linked via foreign key to dimension tables 104, 106 and 108. Dimension table 104, 106 and 108 thus represent dimensions of fact table 102.

An analogous OLAP cube is defined by three dimensions 110, 112 and 114. Region dimension table 108 corresponds to region dimension 110. Day of sale dimension table 104 corresponds to day dimension 112. Finally, product name dimension table 106 corresponds to product dimension 114. Each position in the OLAP cube corresponds to a unique intersection of dimensional data. For example, the data at the exact center (not visible) of the exemplary cube in FIG. 1 corresponds to the intersection of all data for Region 2, all data for Day 2, and all data for Product 2. In other words, the exact center of the cube corresponds to sales data for Product 2, sold in Region 2, on Day 2. In this case, each subsequently applied dimension (each intersection with a subsequent data set) further narrows the resulting data.

Embodiments of the present invention (discussed below) enable the dynamic construction of an OLAP cube based on the a set of related tables such as tables 102, 104, 106, and 108.

Figure 2:
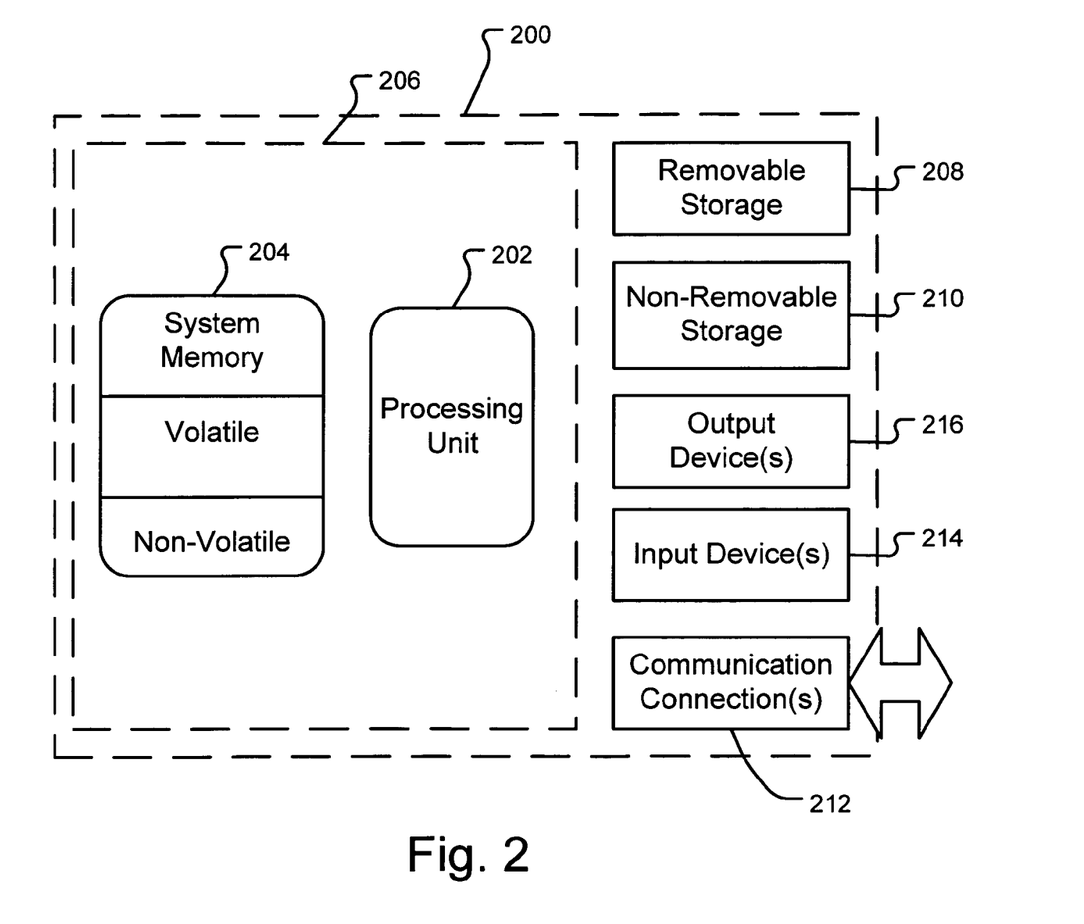
FIG. 2 illustrates an example of a suitable computing system environment on which an embodiment of the present invention may be implemented.

Given that the present invention may be implemented as a computer system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

Figure 3:
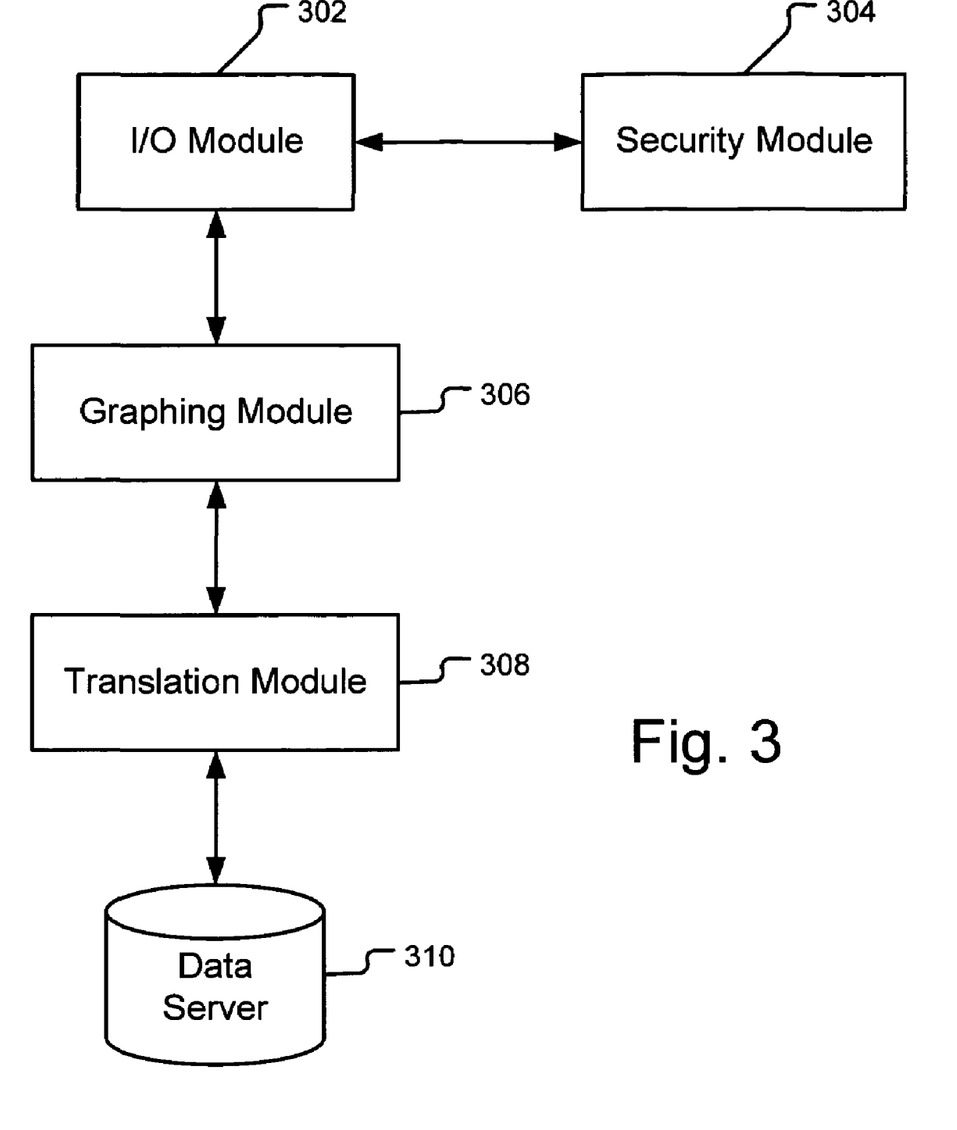
FIG. 3 is a block diagram illustrating the modules that comprise one embodiment of the present invention.

Embodiments of the present invention perform operations related to input/output (I/O), graphing, data translation, cube security, and data server interaction, among other things. FIG. 3 is a block diagram illustrating the modules for these tasks according to one embodiment of the present invention.

In an embodiment, I/O module 302 provides a user interface with which users can interact with security module 304 and graphing module 306 (both discussed below), and indirectly, Translation Module 308. I/O module 302 sends database specification data to security module 304 so that security module 304 can process the specified database. In an embodiment, other data such as a specification of one or more permission categories, user permission data, user group permission data, etc. may be sent to security module 304. In turn, I/O module 302 can receive permission settings from security module 304. In an embodiment, I/O module 302 allows users to modify the permission settings received from security module 304, and send the modified permission settings back to security module 304.

In another embodiment, I/O module 302 sends a project specification to graphing module 306. I/O module 302 may receive graph data from graphing module 306 that I/O module 302 can use to display or allow modification of the cube structure created by graphing module 306 (said creation is discussed in detail below, in conjunction with FIG. 4). In an embodiment, I/O module 302 sends a root table specification to graphing module 306. The root table specification indicates from which table graphing module 306 is to begin graphing.

Figure 6:
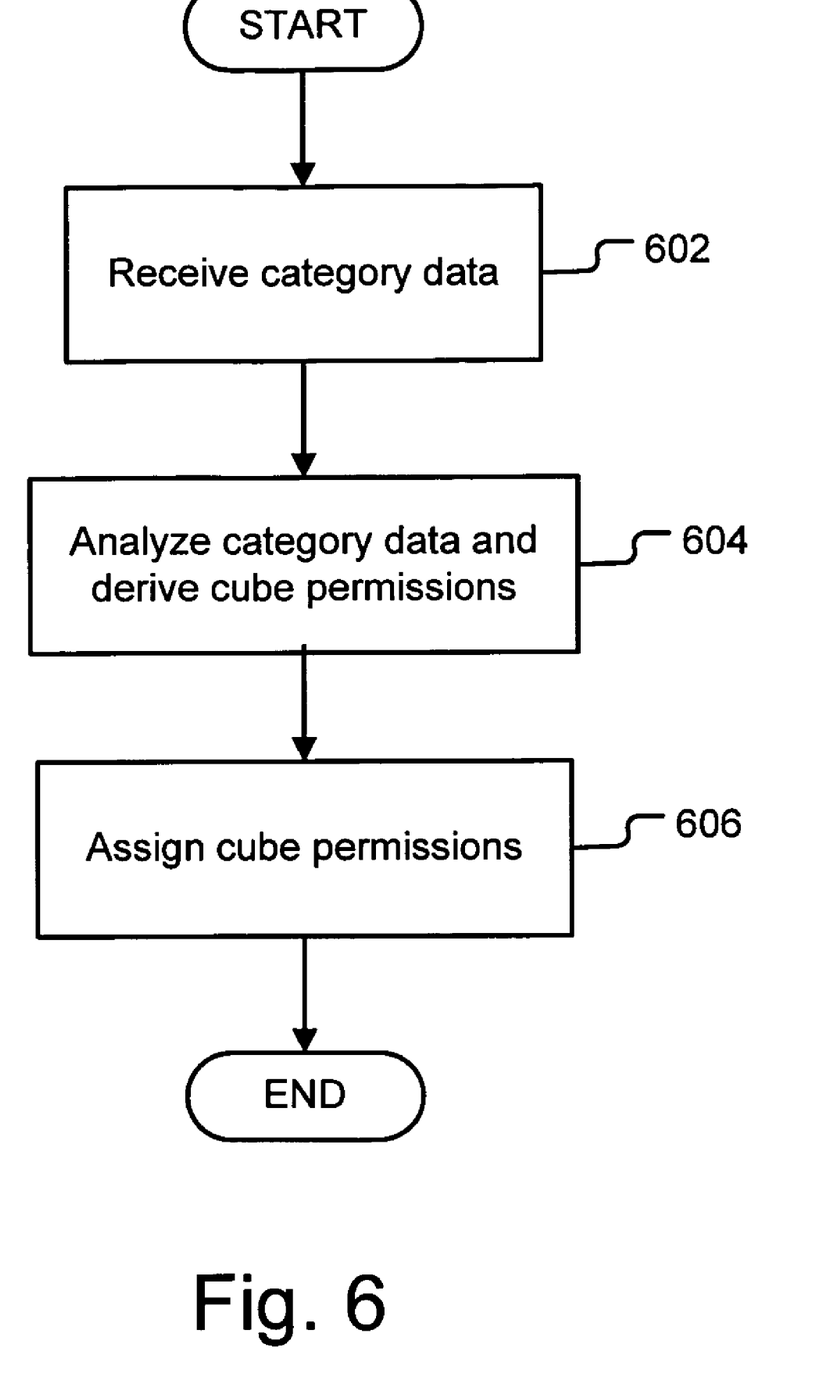
FIG. 6 illustrates the operational flow of the operations performed in one embodiment of the present invention.

Security module 304 receives a database specification from I/O module 302 and derives data permission settings from the specified database (as discussed below, in conjunction with FIG. 6). In an embodiment, security module 304 detects whether a data resource is represented in a cube. If so, security module 304 assigns the permission settings to the corresponding entity in the cube. Security module 304 may store the permission settings separate from, or together with, the associated cube data. In an embodiment, security module 304 may also receive a specification of one or more permission categories, user permission data, or user group permission data which may be used to specify a specific subset of a database on which security module 304 should operate.

Graphing module 306 detects one or more entities connected by a relationship to a starting (root) entity, and builds a graph of the other entities and their interrelationships. Graphing module 306 then traverses the graph and creates a cube based on one or more reachable entities in the graph as dimensions. Building and analyzing the graph is discussed in more detail below, in conjunction with FIG. 4. Graphing module 306 sends cube data to translation module 308 for implementation. In an embodiment, I/O module 302 provides an interface so that users can observe and/or control graphing module 306 operations.

Translation module 308 receives cube data from graphing module 306 and implements the cube on data server 310. Implementation may vary depending on the data server 310 on which the implemented cube must be stored. For example, different data servers may use different database languages and data encoding formats, and thus translation module 308 may support a variety of server protocols for interacting with a variety of databases. In an embodiment, translation module 308 uses an Analysis Management Objects (AMO) protocol to interact with data server 310. In another embodiment, translation module 308 uses a Decision Support Objects (DSO) transaction protocol to interact with data server 310. In yet another embodiment, translation module 308 stores data on a local server with no such proprietary format. In such a case, a translation protocol is not needed, and data and/or mappings associated with a cube may be stored in a native format. Other transaction protocols not listed here may also be used in conjunction with translation module 308.

In an embodiment, graphing module 306 is substantially independent from translation module 308. The resulting two-layer model allows easy, flexible support for new or additional database server protocols. If a new format data server 310 is to be used, an appropriate transaction protocol can be added to translation module 308 without necessitating changes to graphing module 306 or other modules.

Figure 4:
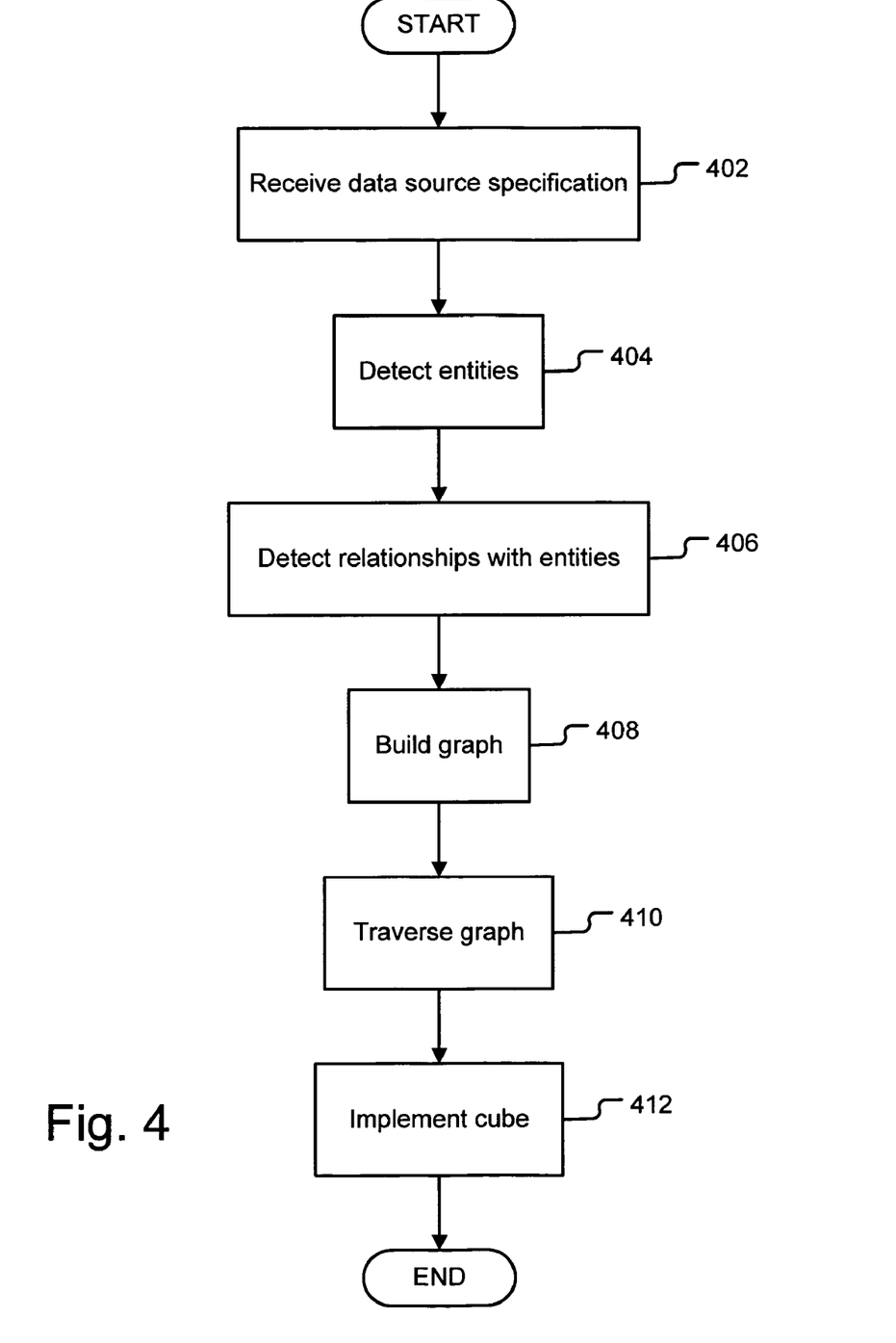
FIG. 4 illustrates the operational flow of the operations performed in one embodiment of the present invention.

In an embodiment, a graph is built and traversed, and the graph structure is leveraged for dynamic cube creation. A cube may be created in response to a request from a user or a request from an automated agent such as an event scheduler. FIG. 4 illustrates the operational flow of dynamic OLAP cube creation in accordance with one embodiment of the present invention.

First, receive operation 402 receives a data source specification. The data source specification may be provided by a user, or by an automated computer agent. The specified data source may be a database file or collection of files. The data source specification may contain additional information to increase specificity, such as a root entity to use as the starting point for graph building. In another embodiment, a default root entity is used. In still another embodiment, a root entity is automatically selected from a list of known entities (see discussion of known entities below, in conjunction with detect operation 404).

Detect operation 404 detects the entities in the data source. These entities may be in the form of data tables or other data structures. Detect operation 406 detects the relationship between the root entity and entities detected by detect operation 404. In an embodiment, a relationship between two entities comprises a foreign key from one entity into the other.

There may exist certain known entities that are intrinsic to a given OLAP context. For example, in the context of a project management OLAP database, certain entities intrinsic to project management may be provided with the application such as tables for projects, resources, tasks, time, assignments, etc. In an embodiment, these entities are already known, and thus do not need to be detected by detect operation 404. In other embodiments, a single root entity is specified, and any other entities must be detected by detect operation 404.

Build operation 408 uses the detected entities and detected relationships to construct a graph of the entities and their relationships. Build operation 408 may use a tree structure to model the graph, a linked list, or other data structure used in the art for modeling a graph.

In an embodiment, operations 404, 406 and 408 are performed iteratively, detecting and adding to the graph the entities related to one entity at a time. In another embodiment, detect operations 404 and 406 may be performed in an alternate order, or combined into a single operation. Likewise, operations 404, 406 and 408 may be combined into a single operation without departing from the scope of the claimed invention.

Traverse operation 410 traverses the graph built by build operation 408. Traversing the graph allows a direct analysis of complex entity interrelationships that may exist within the graph. This analysis is used to gather information about how a cube corresponding to the graph should be structured. In an embodiment, relationships between a fact table and one or more dimensional tables are used to compute which dimensions will be used to define a cube.

Implement operation 412 implements a cube according to the analysis done by traverse operation 410, and stores the cube on a data server. In an embodiment, implement operation 412 uses different database languages and data encoding formats for different types of data servers on which a cube is to be implemented. Implement operation 412 may therefore support a variety of server protocols for interacting with a variety of databases. In an embodiment, implement operation 412 uses an Analysis Management Objects (AMO) protocol to interact with a data server. In another embodiment, implement operation 412 uses a Decision Support Objects (DSO) transaction protocol to interact with a data server. In yet another embodiment, implement operation 412 stores data on a local server with no such proprietary format, and thus does not need to use a transaction protocol. In still another embodiment, implement operation may implement a single cube on a plurality of data servers of the same type or of different types.

In one exemplary embodiment, fact table 102 (FIG. 1) is specified as the root entity. Detect operation 404 detects dimensional table entities 104, 106, and 108 (FIG. 1). Detect operation 406 then detects the three respective relationships between fact table 102 (FIG. 1) and dimensional table entities 104, 106, and 108 (FIG. 1). Build operation 408 then builds a graph of table entities 102, 104, 106 and 108 (FIG. 1). The graph is traversed by traverse operation 410, and a cube is implemented by implement operation 412. The resulting cube will contain data from fact table 102 (FIG. 1), and the cube will be dimensioned using the dimensional tables directly related to fact table 102 (FIG. 1) as dimensions. Finally, implement operation 412 then stores the cube to a data server. If necessary, implement operation 412 uses a transaction protocol appropriate to the data server to save the cube on the data server.

Many OLAP databases support both one-to-one and many-to-many relationships between entities. A one-to-one relationship is an association between two tables in which the primary key value of each record in the primary table corresponds to the value in the matching field or fields of one, and only one, record in the related table. For example, the relationship between an Employees table (containing employee data) and a Mailboxes table (containing email addresses) is a one-to-one relationship if each employee has only one mailbox, and each mailbox is assigned to only one employee. In contrast, a many-to-many relationship is an association between two tables in which one record in either table can relate to many records in the other table.

One hazard associated with performing measurements on a database containing many-to-many relationships is double-measuring. Double-measuring is when a number associated with an entity is mistakenly measured more than once. An illustration of double-measuring is now presented in conjunction with FIG. 5. The illustrated embodiment falls within the context of a project management OLAP database. Resource entities are associated with one or more project entities, and project entities are associated with one or more portfolio entities. In the illustrated embodiment, portfolio 502 is said to contain project 504 in the parlance of project management applications. Resources 506 and 508 are associated with project 504. Measuring the resources associated with project 504 is a relatively simple manner; resources 506 and 508 are arithmetically summed along the desired dimension. However, portfolios 502 and 510 both contains project 504. When measuring the resources consumed by all portfolios, a simple traversal of the graph formed by the described entities may result in counting resources 506 and 508 twice, respectively, toward the total resource measurement.

Figure 5:
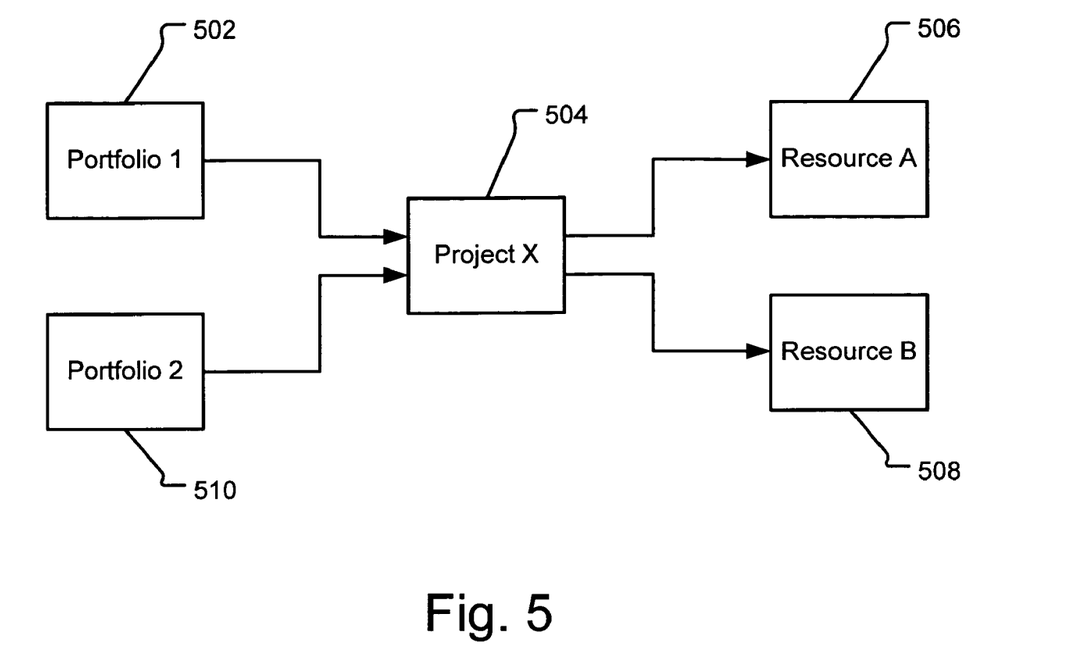
FIG. 5 illustrates a plurality of related tables, which is used to explain double measuring and how it may be avoided using embodiments of the present invention.

More specifically, a simple traversal might first iterate over portfolio 502 (using portfolio 502 as a root entity). Project 504 would be detected as being related to portfolio 502 via a foreign key. Traversal might then proceed to project 504, where resources 506 and 508 would be detected as being related to project 504 via foreign keys. The resources would be measured accordingly, and traversal would next iterate over portfolio 510 (using portfolio 510 as a root entity). Project 504 would be detected as being related to portfolio 510 via a foreign key. Traversal would again proceed to project 504, where resources 506 and 508 would be detected as being related to project 504 via foreign keys. Resources 506 and 508 would again be measured, and added to the overall measurement sum. As a result, even though the same project 504 and its associated resources 506 and 508 are shared by both portfolios 502 and 510, resources 506 and 508 would each be counted twice toward an overall resource measurement, yielding a resource measurement that is twice the actual quantity of resources.

In embodiments of the present invention, a cube is built such that double-measuring is avoided by way of analysis during traversal. In one embodiment, each entity is marked when it is first encountered during traversal. Referring again to FIG. 5, project 504 would be marked when traversed in association with portfolio 502. Later, when traversal of portfolio 510 again encounters project 504, further traversal may be circumvented. In another embodiment, each entity is assigned a unique identifier, and a list of which entities have already been encountered is maintained. An entity already on the encountered list may therefore be skipped when subsequently encountered during traversal. Such a unique identifier may be randomly generated, or may be a function of entity and relationship characteristics such as the table in which the foreign key resides, the name of one or both of the related entities, etc. Other embodiments using other methods known in the art to avoid retracing points on a graph are also envisioned.

In a typical OLAP context, data permissions may be mapped individually (e.g., user A has access to data entities B and C), or by group (e.g., users of class X have access to data entities of class Y). OLAP database permissions are managed using structures called categories. A category maps users (or groups thereof) to data resources. The mapping may also include a specific permission level to allow a user access to only a subset of a particular data resource. For example, it may be desirable to allow a group of human resources employees unconditional access to a salary data table, whereas all other groups of employees are allowed access only to their own data in the salary data table. This access differential may be encoded in the mapping between category and user.

In an embodiment, permissions for a cube can be dynamically derived from the OLAP data permissions. FIG. 6 illustrates the operational flow of such a dynamic derivation in accordance with one embodiment of the present invention.

Receive operation 602 receives category data which may contain users (e.g., John Smith), user groups (e.g., Human Resources Employees), data resources (e.g., the Salaries data table), and/or categories of resources (e.g., Employee Records data), and mappings therebetween. This data is used by analyze operation 604.

Analyze operation 604 first analyzes the category data received by receive operation 602. Permissions associated with a particular data resource are checked to see if that data resource exists in the cube. If the data resource does exist in the cube, the permissions associated with the data resource are derived by analyze operation 604, and mapped to the corresponding position in the cube by assign operation 606. Categories of data resources may map to a plurality of positions in the cube, and so each data resource in the category is checked by analyze operation 604 to see if a corresponding data resource exists in the cube. As before, if a given resource does exist in the cube, the corresponding permissions are derived by analyze operation 604, and mapped to the corresponding position in the cube by assign operation 606. When a data resource in a cube is subsequently accessed by a user, the user may be checked against the permissions associated with that portion of the cube, and permission granted or denied accordingly.

Cube permissions may be derived in real time, or in advance of usage by a database administrator. In an embodiment, a reference to category data is received by operation 602 instead of actual category data, and receive operation 602 then retrieves the referenced category data for analysis by analyze operation 604.

The various embodiments described above are provided by way of illustration only and should not be construed to limit the invention. For example, it is envisioned that embodiments of the present invention may be used in other, non-OLAP multidimensional data contexts in which a cube structure is used for measurement. It is further envisioned that a plurality of related dynamic OLAP cubes may be combined into a larger dynamic cube. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer storage medium encoding a computer program of instructions for executing a computer process for dynamically implementing an OLAP cube, the computer process comprising:
   receiving a data source specification;
   detecting entities in the data source specification;

detecting relationships between the entities in the data source specification;

constructing a graph of the entities and the relationships between them;

traversing the graph to perform a direct analysis of complex entity interrelationships that exist within the graph;

gathering information about how an OLAP cube corresponding to the graph is to be structured;

dynamically implementing the OLAP cube that corresponds to the graph, wherein new dimensions of the OLAP cube are based upon the gathered information; and recomputing the OLAP cube based upon the one or more relationships between the entities.

2. The computer storage media of claim 1 further comprising instructions for storing the OLAP cube on one or more data servers, wherein the OLAP cube is implemented using different database languages and data encoding formats for different types of the one or more data servers.

3. A computer-implemented method for the dynamic implementation of an Online Analytical Processing (OLAP) cube comprising:

receiving a data source specification;

detecting one or more relationships between entities in the data source specification;

constructing a graph of the entities and the one or more relationships;

traversing the graph to gather information about the one or more relationships between the entities;

dynamically implementing the OLAP cube on a data server based on the gathered information about the one or more relationships between the entities, wherein the gathered information defines new dimensions of the OLAP cube; and recomputing the OLAP cube based upon the new dimensions.

4. The computer-implemented method as defined in claim 3, wherein said traversing the graph comprises analyzing a relational structure of the entities.

5. The computer-implemented method as defined in claim 3, further comprising receiving a specification of a root entity.

6. The computer-implemented method as defined in claim 3, further comprising automatically selecting a root entity.

7. The computer-implemented method as defined in claim 3, wherein the dynamically implementing the OLAP cube on a data server further comprises selecting and using an appropriate transaction protocol.

8. The computer-implemented method as defined in claim 3, further comprising deriving permissions for the OLAP cube.

9. The computer-implemented method as defined in claim 3, wherein said traversing the graph further comprises detecting one or more previously-encountered values.

10. The computer-implemented method as defined in claim 3, wherein a given OLAP cube is implemented on a plurality of data servers.

11. The computer-implemented method as defined in claim 10, wherein said plurality of data servers includes data servers using a plurality of transaction protocols.

12. The computer-implemented method as defined in claim 3, wherein said entities are derived from one or more custom fields.

13. The computer-implemented method as defined in claim 3, further comprising:

receiving category data;

analyzing one or more categories;

deriving cube data permission settings based on the one or more categories, wherein at least one of the cube data permission settings defines user access to cube data; and associating the cube data permission settings with the cube data.

14. The computer-implemented method as defined in claim 13, wherein derivation of the cube data permission settings is performed in real time.

15. The computer-implemented method as defined in claim 3, wherein said traversing the graph comprises processing association tables and modeling many-to-many relationships.

16. The computer-implemented method as defined in claim 15, wherein said traversing the graph prevents double-measuring of cube data.

17. The computer-implemented method as defined in claim 3, further comprising storing the OLAP cube on one or more data servers, wherein the OLAP cube is implemented using different database languages and data encoding formats for different types of the one or more data servers.

18. The computer-implemented method as defined in claim 3, wherein the OLAP cube is implemented using an Analysis Management Objects protocol to interact with the data server.

19. The computer-implemented method as defined in claim 3, wherein the OLAP cube is implemented using a Decision Support Objects transaction protocol.

20. The computer-implemented method as defined in claim 3, wherein dynamically implementing the OLAP cube on a data server based on the gathered information about the one or more relationships between the entities and recomputing the OLAP cube based upon the one or more relationships between the entities occur at runtime.

21. The computer-implemented method as defined in claim 3, wherein recomputing the OLAP cubed based upon the one or more dimensional relationships between entities occurs at runtime.

* * * * *

UNITED STATES PATENT AND TRADEMARK OFFICE
CERTIFICATE OF CORRECTION

PATENT NO. : 7,587,410 B2 Page 1 of 1
APPLICATION NO. : 11/087289
DATED : September 8, 2009
INVENTOR(S) : Alexander A. Sourov et al.

It is certified that error appears in the above-identified patent and that said Letters Patent is hereby corrected as shown below:

Column 10, line 49: "cubed" should read "cube"

Signed and Sealed this

Twenty-ninth Day of December, 2009

David J. Kappos
*Director of the United States Patent and Trademark Office*